US008675354B2

(12) United States Patent
L'Hénaff

(10) Patent No.: US 8,675,354 B2
(45) Date of Patent: Mar. 18, 2014

(54) MULTI-MEDIA MEMO BOARD

(75) Inventor: Jean-Jacques L'Hénaff, Pelham, NY (US)

(73) Assignee: Voxx International Corporation, Hauppauge, NY (US)

( * ) Notice: Subject to any disclaimer, the term of this patent is extended or adjusted under 35 U.S.C. 154(b) by 978 days.

(21) Appl. No.: 11/769,487

(22) Filed: Jun. 27, 2007

(65) Prior Publication Data
US 2009/0002190 A1    Jan. 1, 2009

(51) Int. Cl.
G06F 1/16       (2006.01)
H05K 5/00      (2006.01)
H05K 7/00      (2006.01)
E04G 3/00      (2006.01)

(52) U.S. Cl.
USPC .......... 361/679.22; 340/815.49; 340/500; 340/531; 348/789; 348/794; 348/207.1; 715/230; 248/442.2; 248/444.1; 248/274.1; 40/711; 368/40; 434/408; 345/204

(58) Field of Classification Search
USPC ............ 345/905, 204, 173; 340/500, 531, 340/815.49; 348/789, 794, 207.1, 375, 552; 715/230; 40/711, 649; 368/41; 434/408; 361/679.22; 248/442.2, 248/444.1, 447.1
See application file for complete search history.

(56) References Cited

U.S. PATENT DOCUMENTS

| | | | | |
|---|---|---|---|---|
| 3,113,559 A | * | 12/1963 | Friedman | 211/69.9 |
| 3,692,265 A | * | 9/1972 | Barriger | 248/220.1 |
| 4,582,286 A | * | 4/1986 | Mancuso | 248/459 |
| 4,600,298 A | * | 7/1986 | Emmert | 355/75 |
| 4,622,767 A | * | 11/1986 | Sullivan | 40/120 |
| 4,844,398 A | * | 7/1989 | Konkle | 248/240.4 |
| D307,134 S | * | 4/1990 | Makidera | D14/342 |
| 4,998,694 A | * | 3/1991 | Barteaux | 248/100 |
| 5,065,972 A | * | 11/1991 | Buckshaw et al. | 248/345.1 |
| 5,301,915 A | * | 4/1994 | Bahniuk et al. | 248/452 |
| 5,328,145 A | * | 7/1994 | Charapich | 248/442.2 |
| 5,329,712 A | * | 7/1994 | Keller | 40/747 |
| D349,733 S | * | 8/1994 | Svee | D20/42 |
| 5,398,905 A | * | 3/1995 | Hinson | 248/442.2 |
| 5,475,938 A | * | 12/1995 | Bergan | 40/754 |
| D367,857 S | * | 3/1996 | Emmerik | D14/450 |
| 5,527,568 A | * | 6/1996 | Boone et al. | 428/14 |
| 5,664,673 A | * | 9/1997 | Perry | 206/371 |
| D385,857 S | * | 11/1997 | Cohen et al. | D14/390 |

(Continued)

OTHER PUBLICATIONS

International Search Report dated Oct. 23, 2008 in corresponding international application No. PCT/US08/67518.

Primary Examiner — Matthew Fry
(74) Attorney, Agent, or Firm — F. Chau & Associates, LLC

(57) ABSTRACT

A memo board, including: a front housing including a first opening; a display module disposed behind a front side of the front housing, a front panel of the display module being exposed through the first opening of the front housing; a circuit board disposed behind the front side of the front housing, the circuit board including a memory and a controller; a back housing configured to receive the circuit board, the display module and the front housing through an opening at a front side of the back housing, the back housing including a mounting connector at a back side of the back housing; and a screen disposed at the front side of the front housing, the front panel of the display module being viewable through the screen, the screen being secured to and removed from the front housing by first and second fasteners.

14 Claims, 20 Drawing Sheets

(56) References Cited

U.S. PATENT DOCUMENTS

| | | | |
|---|---|---|---|
| 5,842,672 A * | 12/1998 | Sweere et al. | 248/278.1 |
| 5,880,713 A * | 3/1999 | Belardinelli | 345/156 |
| 5,890,603 A * | 4/1999 | Arguin et al. | 211/45 |
| 5,901,937 A * | 5/1999 | Compeau et al. | 248/442.2 |
| 5,987,825 A * | 11/1999 | Rosen | 52/36.1 |
| 5,988,582 A * | 11/1999 | Olivo | 248/442.2 |
| 6,015,123 A * | 1/2000 | Perez et al. | 248/220.1 |
| 6,031,714 A | 2/2000 | Ma | |
| 6,266,236 B1 * | 7/2001 | Ku et al. | 361/679.27 |
| 6,272,779 B1 * | 8/2001 | Seiber et al. | 40/607.14 |
| 6,364,126 B1 * | 4/2002 | Enriquez | 211/13.1 |
| 6,366,452 B1 * | 4/2002 | Wang et al. | 361/679.22 |
| 6,371,345 B1 * | 4/2002 | Leyden et al. | 224/553 |
| 6,400,560 B1 * | 6/2002 | Chian | 361/679.27 |
| 6,409,134 B1 * | 6/2002 | Oddsen, Jr. | 248/274.1 |
| 6,412,744 B1 * | 7/2002 | Wollam et al. | 248/442.2 |
| 6,412,889 B1 * | 7/2002 | Hummell et al. | 312/9.53 |
| 6,439,530 B1 * | 8/2002 | Schoenfish et al. | 248/346.06 |
| 6,443,415 B1 * | 9/2002 | Sundblad | 248/442.2 |
| 6,550,739 B1 * | 4/2003 | Brindisi | 248/476 |
| 6,560,094 B2 * | 5/2003 | Schmidt | 361/679.6 |
| 6,686,900 B1 * | 2/2004 | Levy et al. | 345/156 |
| 6,690,912 B1 * | 2/2004 | Vaughn | 434/308 |
| 6,702,604 B1 * | 3/2004 | Moscovitch | 439/374 |
| 6,736,644 B1 * | 5/2004 | Vaughn | 434/408 |
| 6,758,454 B2 * | 7/2004 | Smed | 248/314 |
| 6,812,958 B1 * | 11/2004 | Silvester | 348/207.1 |
| 6,854,202 B1 * | 2/2005 | Ives et al. | 40/491 |
| D505,697 S * | 5/2005 | Haddox | D19/52 |
| D505,858 S * | 6/2005 | O'Keene | D8/355 |
| 6,905,101 B1 * | 6/2005 | Dittmer | 248/274.1 |
| 7,070,837 B2 * | 7/2006 | Ross | 428/1.1 |
| 7,165,687 B1 * | 1/2007 | Stevens et al. | 211/86.01 |
| 7,167,100 B2 * | 1/2007 | Yeh | 340/692 |
| 7,245,270 B1 * | 7/2007 | Boos | 345/1.1 |
| D559,661 S * | 1/2008 | Wohlford et al. | D8/373 |
| 7,347,020 B2 * | 3/2008 | Ray et al. | 40/781 |
| 7,489,500 B2 * | 2/2009 | Liou et al. | 361/679.21 |
| 7,589,959 B2 * | 9/2009 | Ikeda | 361/679.21 |
| 7,594,823 B2 * | 9/2009 | Moscovitch | 439/374 |
| 7,604,481 B2 * | 10/2009 | Owen et al. | 434/408 |
| D603,386 S * | 11/2009 | Le | D14/239 |
| 7,632,102 B2 * | 12/2009 | Macli et al. | 434/421 |
| 7,690,614 B1 * | 4/2010 | Mudd et al. | 248/346.06 |
| D617,834 S * | 6/2010 | Vasconcelos | D19/52 |
| 7,819,368 B2 * | 10/2010 | Jung et al. | 248/133 |
| 7,841,574 B1 * | 11/2010 | Harris | 248/444.1 |
| D640,654 S * | 6/2011 | Montag et al. | D14/129 |
| 7,954,780 B2 * | 6/2011 | Dittmer | 248/284.1 |
| 7,992,831 B2 * | 8/2011 | Fan | 248/205.5 |
| 8,020,821 B2 * | 9/2011 | Chen et al. | 248/220.22 |
| 8,072,739 B2 * | 12/2011 | Dittmer | 361/679.01 |
| 8,146,280 B2 * | 4/2012 | Mehler | 40/786 |
| 8,162,282 B2 * | 4/2012 | Hu et al. | 248/447 |
| 8,254,092 B2 * | 8/2012 | Russell et al. | 361/679.01 |
| 2001/0033487 A1 * | 10/2001 | Crelin | 362/147 |
| 2001/0037593 A1 * | 11/2001 | Korpai | 40/594 |
| 2002/0011544 A1 * | 1/2002 | Bosson | 248/121 |
| 2002/0084286 A1 * | 7/2002 | Lewis et al. | 222/156 |
| 2003/0057343 A1 * | 3/2003 | Jacobs | 248/441.1 |
| 2003/0137496 A1 * | 7/2003 | Stevens et al. | 345/173 |
| 2003/0215551 A1 * | 11/2003 | Garwood | 426/392 |
| 2004/0012917 A1 * | 1/2004 | Jung et al. | 361/681 |
| 2004/0118987 A1 * | 6/2004 | Matko et al. | 248/282.1 |
| 2004/0262185 A1 * | 12/2004 | Mills | 206/483 |
| 2005/0022439 A1 * | 2/2005 | Crump | 40/711 |
| 2005/0023420 A1 * | 2/2005 | Sadeh et al. | 248/206.5 |
| 2005/0061937 A1 * | 3/2005 | Kim | 248/274.1 |
| 2005/0066560 A1 * | 3/2005 | Ternovits et al. | 40/606.19 |
| 2005/0189455 A1 * | 9/2005 | Formon | 248/200 |
| 2005/0191611 A1 * | 9/2005 | Owen et al. | 434/408 |
| 2005/0210784 A1 * | 9/2005 | Hahn | 52/287.1 |
| 2005/0229455 A1 * | 10/2005 | Helmlinger et al. | 40/661 |
| 2005/0263658 A1 * | 12/2005 | Fontana et al. | 248/231.91 |
| 2005/0284991 A1 * | 12/2005 | Saez | 248/122.1 |
| 2006/0055797 A1 * | 3/2006 | Yeh | 348/231.4 |
| 2006/0073466 A1 * | 4/2006 | Solomon | 434/408 |
| 2006/0091280 A1 * | 5/2006 | Rothschild | 248/442.2 |
| 2006/0187020 A1 * | 8/2006 | Smithkovec-Chilton et al. | 340/531 |
| 2007/0006505 A1 * | 1/2007 | Ray et al. | 40/781 |
| 2007/0062050 A1 * | 3/2007 | Worrick, III | 30/541 |
| 2007/0077815 A1 * | 4/2007 | White et al. | 439/607 |
| 2007/0186384 A1 * | 8/2007 | Broehl et al. | 16/355 |
| 2007/0216660 A1 * | 9/2007 | Sposato et al. | 345/173 |
| 2007/0245683 A1 * | 10/2007 | Barry | 52/746.1 |
| 2007/0247800 A1 * | 10/2007 | Smith et al. | 361/683 |
| 2007/0290588 A1 * | 12/2007 | Oh et al. | 312/401 |
| 2008/0035816 A1 * | 2/2008 | Ciungan | 248/276.1 |
| 2008/0053610 A1 * | 3/2008 | Schneider | 156/290 |
| 2008/0070228 A1 * | 3/2008 | Gerules | 434/408 |
| 2008/0078916 A1 * | 4/2008 | Nevers et al. | 248/475.1 |
| 2008/0122934 A1 * | 5/2008 | Marotti | 348/207.1 |
| 2008/0164399 A1 * | 7/2008 | Hall | 248/475.1 |
| 2008/0165137 A1 * | 7/2008 | Lahade et al. | 345/173 |
| 2008/0166915 A1 * | 7/2008 | Kendall et al. | 439/527 |
| 2008/0168205 A1 * | 7/2008 | McCoy et al. | 710/304 |
| 2008/0192411 A1 * | 8/2008 | McCoy | 361/679 |
| 2008/0247141 A1 * | 10/2008 | Kendall et al. | 361/729 |
| 2008/0277539 A1 * | 11/2008 | Lee et al. | 248/157 |
| 2009/0009316 A1 * | 1/2009 | Kendall et al. | 340/500 |
| 2009/0013560 A1 * | 1/2009 | McKinney et al. | 36/98 |
| 2009/0020658 A1 * | 1/2009 | Huang | 248/124.1 |
| 2009/0068632 A1 * | 3/2009 | Thompson et al. | 434/416 |
| 2009/0090831 A1 * | 4/2009 | Henning et al. | 248/278.1 |
| 2009/0121103 A1 * | 5/2009 | Wiese | 248/220.1 |
| 2009/0166492 A1 * | 7/2009 | Choi | 248/220.41 |
| 2009/0199445 A1 * | 8/2009 | Blaeser et al. | 40/600 |
| 2009/0309956 A1 * | 12/2009 | Hawkins et al. | 348/14.08 |
| 2010/0045785 A1 * | 2/2010 | Carl | 348/61 |
| 2010/0099073 A1 * | 4/2010 | Howard et al. | 434/408 |
| 2010/0171014 A1 * | 7/2010 | Stemple | 248/201 |
| 2010/0172072 A1 * | 7/2010 | Monaco | 361/679.01 |
| 2011/0019344 A1 * | 1/2011 | Russell et al. | 361/679.01 |

\* cited by examiner (a)

(b)

MULTI-MEDIA MEMO BOARD

BACKGROUND OF THE INVENTION

1. Technical Field

The present invention relates to memo boards, and more particularly, to a multi-media memo board.

2. Discussion of the Related Art

Memo boards have found use in the home as a means of keeping personal reminders and important household information. In general, memo boards incorporate a wide variety of surfaces including a permeable surface suitable for receiving push-pins, or a surface suitable for writing on, such as a chalkboard, or a write-on/wipe-off surface. Memo boards are generally mounted on walls or other suitable objects in a central location of the home such as a kitchen or foyer.

Although the above-described memo boards are suitable for leaving short written messages and placing reminder notes thereon, these are generally the only viable functions of the memo boards. As a result, in today's hectic and technologically advanced world many households are storing messages, shopping lists, pictures, etc. on a centralized computer. However, keeping a computer in a central location such as a kitchen or foyer is impractical for many families, not only because of the space required by the computer but also because of the cost of the computer.

Accordingly, there exists a need for a compact and low-cost device that can be used in a central location of a home as a memo board while incorporating a variety of features desired by today's technology hungry families.

SUMMARY OF THE INVENTION

In an exemplary embodiment of the present invention, a memo board, comprises: a front housing including a first opening; a display module disposed behind a front side of the front housing, a front panel of the display module being exposed through the first opening of the front housing; a circuit board disposed behind the front side of the front housing, the circuit board including a memory and a controller; a back housing configured to receive the circuit board, the display module and the front housing through an opening at a front side of the back housing, the back housing including a mounting connector at a back side of the back housing; and a screen disposed at the front side of the front housing, the front panel of the display module being viewable through the screen, the screen being secured to and removed from the front housing by first and second fasteners.

The memo board further comprises a keypad disposed behind the front side of the front housing, the keypad including a plurality of keys, an external surface of each of the keys being exposed through a second opening of the front housing.

The memo board further comprises a mounting bracket configured to connect to the back side of the back housing via the mounting connector. The mounting bracket includes a pair of flaps that are adjustable to conform to a surface to which the mounting bracket is to be connected. Each adjustable flap includes tape for connecting the mounting bracket to the surface. The mounting bracket includes at least two mounting holes through which mounting screws are inserted to connect the mounting bracket to a surface.

The memo board further comprises a metal plate disposed in between the front housing and the screen along an edge of the front side of the front housing.

The screen is made of acrylic. The screen is made of polycarbonate covered with an acrylic film.

The first and second fasteners are a snap and a hook, respectively.

The memo board further comprises a camera configured to take pictures to be displayed on the front panel of the display module. The memo board further comprises an adjustable arm connected to the camera, the adjustable arm configured to move the camera.

The memo board further comprises a microphone configured to receive an audio message, a speaker configured to play the audio message and a light source configured to emit light to indicate to a user that the audio message is waiting to be played.

The back housing further includes a notepad cavity for holding a notepad and a marker cavity for holding a marker.

The memo board further comprises a mounting stand configured to connect to the back side of the back housing via the mounting connector.

In an exemplary embodiment of the present invention, a memo board, comprises: a front housing including first and second openings, first and second cavities, a first recess and first and second fasteners; a display module disposed behind a front side of the front housing, a front panel of the display module being exposed through the first opening of the front housing; a circuit board disposed behind the front side of the front housing, the circuit board including a memory and a controller; a back housing configured to receive the circuit board, the display module and the front housing through an opening at a front side of the back housing, the back housing including a mounting connector at a back side of the back housing, a camera having a lens, the lens of the camera being exposed through the second opening of the front housing, and a concave edge through which the second cavity is accessed; a keypad disposed in the first recess of the front housing; and a screen disposed over the front side of the front housing and not over the keypad and the camera lens, the screen connected to the front housing by the first and second fasteners.

The memo board further comprises a notepad disposed in the first cavity and a marker disposed in the second cavity.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
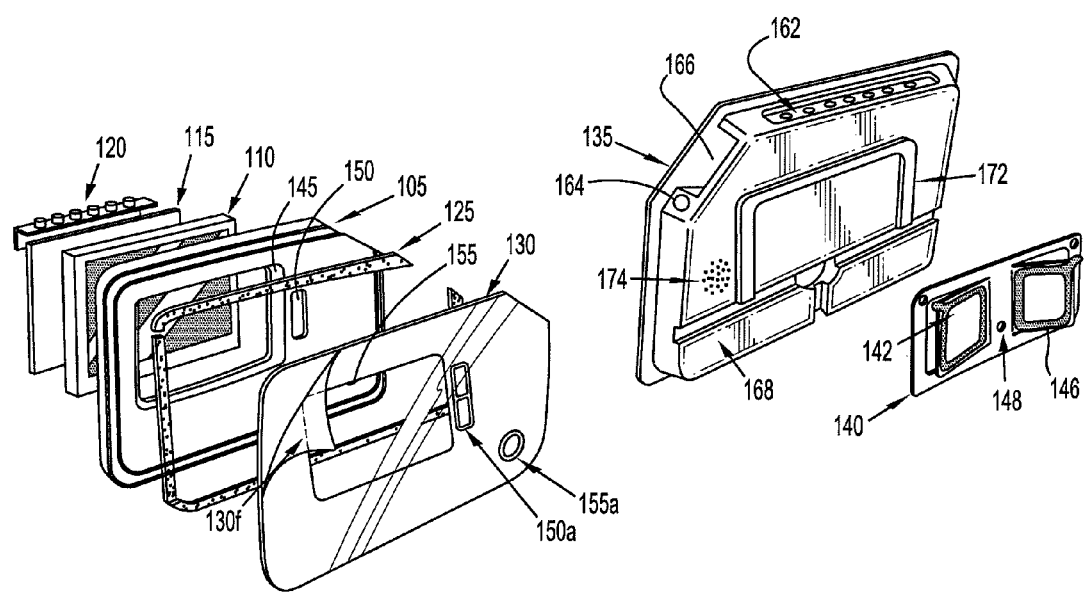
FIG. 1 illustrates components of a multi-media memo board according to an exemplary embodiment of the present invention.

FIG. 1 illustrates components of a multi-media memo board according to an exemplary embodiment of the present invention.

As shown in FIG. 1, the multi-media memo board includes a front housing 105, a display module 110, a printed circuit board 115, a keypad 120, metal strips 125, a screen 130, a back housing 135 and a mounting bracket 140.

The front housing 105 is made of plastic such as acrylonitrile butadiene styrene (ABS), and includes a first opening 145, a second opening 150 and a third opening 155. The first opening 145 exposes a front panel of the display module 110. The second and third openings 150 and 155 expose external surfaces of keys or buttons disposed behind a front surface of the front housing 105. The front surface of the front housing 105 may include painted graphics that are visible through the screen 130.

The display module 110 is, for example, a liquid crystal, plasma or organic electro-luminescence display module. The display module 110 is disposed behind the front surface of the front housing 105. The printed circuit board 115 includes various circuitry used to control operations of the multi-media memo board. The printed circuit board 115 is disposed behind the display module 110. The printed circuit board 115 may also be disposed adjacent to the display module 110.

The keypad 120 includes a plurality of keys/buttons/switches and is used to provide the multi-media memo board with a variety of input commands. For example, the input commands can be power on/off, play/pause/mode, menu, up/copy/delete, down/rotate, previous/return and next, or scroll up/down, select and memo. The keypad 120 is disposed on an upper edge of the front housing 105. The keypad 120 may also be disposed behind the front surface of the front housing 105 and exposed, for example, through the second opening 150.

The screen 130, for example, is a solid piece of acrylic or a piece of polycarbonate covered with an acrylic film 130f. The acrylic surface of the screen 130 enables the screen 130 to function as a write-on/wipe-off surface. The acrylic surface of the screen 130 may also include a mirror-like coating that enables the screen 130 to look like a mirror when the multi-media memo board is in a stand-by mode or off. The screen 130 is disposed over the front surface of the front housing 105. The screen 130 also has openings 150a and 155a through which external surfaces of keys/buttons/switches protruding through the openings 150 and 155 are exposed. The screen 130 may also be configured not to have any openings for exposing external surfaces of key/buttons/switches. The screen 130 may be removable from the multi-media memo board. Key hooks can be included, for example, across the bottom of the screen 130.

The metal strips 125 are disposed between the front housing 105 and the screen 130 along edges of the front surface of the front housing 105. The metal strips 125 enable, for example, written or printed papers, pictures, etc., to be secured to the multi-media memo board with magnets. The metal strips 125 may be replaced with a permeable surface suitable for receiving push-pins. The permeable surface would be on or adjacent to the screen 130.

The back housing 135 is made of plastic such as ABS, and includes an inner cavity that receives the printed circuit board 115, display module 110, front housing 105, metal strips 125, screen 130 and keypad 120 through an opening at a front side thereof. When these components are received in the back housing 135, the front panel of the display module 110 is viewable through the screen 130. The back housing 135 includes keypad area 162, which is a horizontal recessed surface that includes a plurality openings through which external surfaces of the keys/buttons/switches on the keypad 120 and an external surface of a light source such as a light emitting diode protrude. The back housing 135 also includes a marker area 164 that is, for example, a cylindrical cavity that enables a dry erase marker to be stored. The back housing 135 further includes a notepad area 166 that is, for example, a rectangular or square cavity that enables a post-it notepad with approximately the following dimensions 3"×3"×⅜" to be stored. Also included in the back housing 135 is a power chord area 168, which is a horizontal groove along which a power chord is snugly fit so that the multi-media memo board can be laid flat against a surface, and a speaker opening 174. The back housing 135 additionally includes a mounting bracket connector 172 that is a slot in which the mounting bracket 140 is slidably connected to the back housing 135. There may also be a gap between the first housing 105 and the back housing 135 so that a user may wedge a postcard, coupon, picture, etc. therein.

The mounting bracket 140 enables the multi-media memo board to be mounted, for example, to a vertical surface such as a refrigerator or wall. The mounting bracket 140 includes a pair of flaps 142 with living hinges that allow the mounting bracket 140 to conform, for example, to a curved refrigerator door. The flaps 142 include, for example, a two-sided acrylic tape 146 for securing the mounting bracket 140 to a refrigerator door. The mounting bracket 140 also includes a plurality of mounting holes 148 for enabling the mounting bracket 140 to be secured to a wall using screws or wall anchors.

Figure 2:
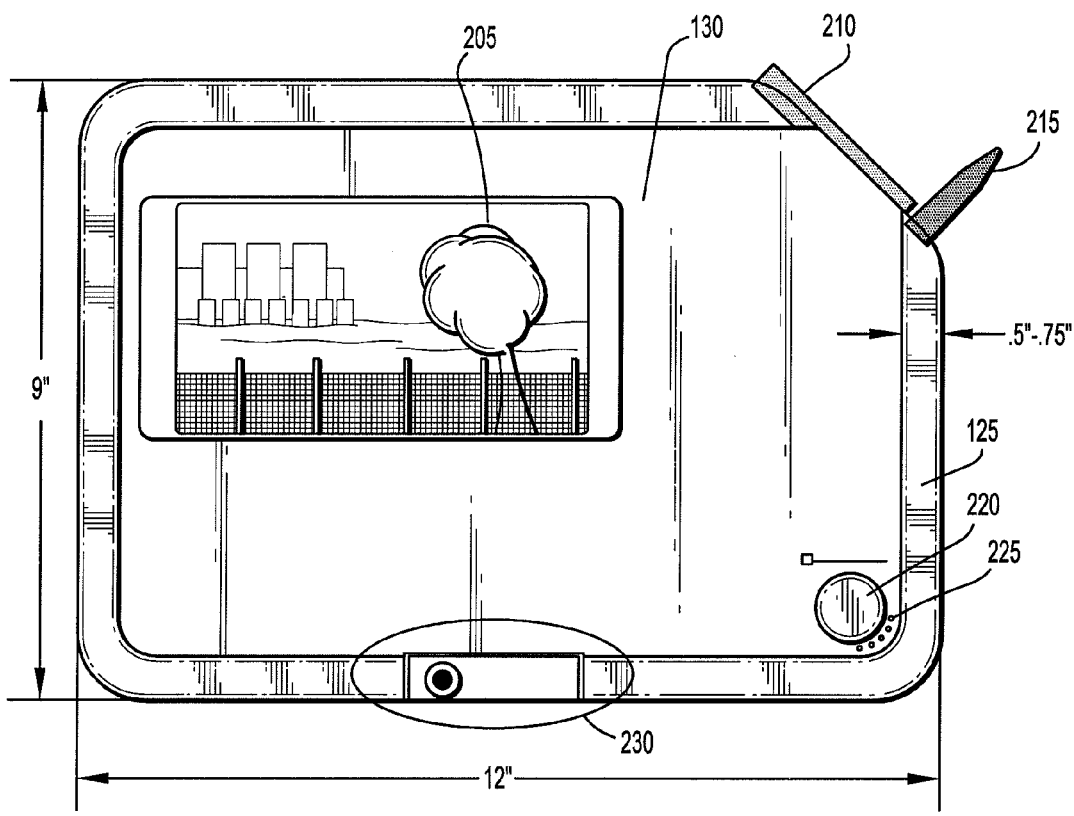
FIG. 2 is a front view of a multi-media memo board according to an exemplary embodiment of the present invention.

FIG. 2 is a front view of a multi-media memo board according to an exemplary embodiment of the present invention.

As shown in FIG. 2, when the multi-media memo board is configured similar to the way described above with reference to FIG. 1, a front panel 205 of the display module 110 is viewable through the screen 130. Included with the multi-media memo board of FIG. 2 are a post-it notepad 210 and a dry erase marker 215 inside the notepad area 166 and marker area 164, respectively, a button 220 exposed through the opening 155a, and a microphone opening 225 in the screen 130 for exposing a receiver part of a microphone. The multi-media-memo board of FIG. 2 also includes a camera 230 such as a digital camera having picture and video capabilities. The camera 230 can be, for example, a stationary camera included in back housing 135 and exposed through an opening in the front housing 105 and an opening in the screen 130. The camera 230 can also be, for example, a movable camera that is clipped onto the multi-media memo board and extendible via an arm.

FIG. 2 further illustrates exemplary dimensions of the screen 130 and the metal strips 125. For example, the screen 130 may be around 12 inches wide and around 9 inches high. The metal strips 125 may be around 0.5 to 0.75 inches wide.

Figure 3:
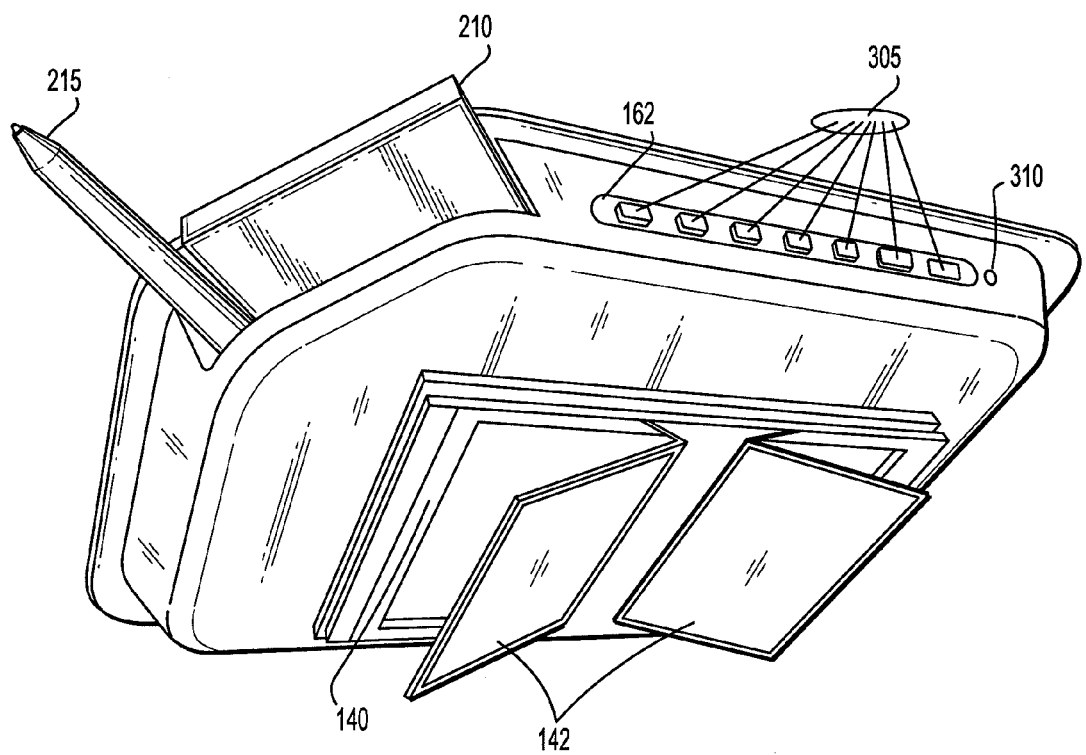
FIG. 3 is a perspective back view of a multi-media memo board according to an exemplary embodiment of the present invention.

FIG. 3 is a perspective back view of a multi-media memo board according to an exemplary embodiment of the present invention.

As shown in FIG. 3, the post-it notepad 210 and the dry erase marker 215 are inside the notepad area 166 and the marker area 164, respectively, external surfaces of keys/buttons/switches 305 on the keypad 120 and an external surface of a light source 310 are protruding from or visible in the keypad area 162 and the mounting bracket 140 is connected to a back of the multi-media memo board.

Figure 4:
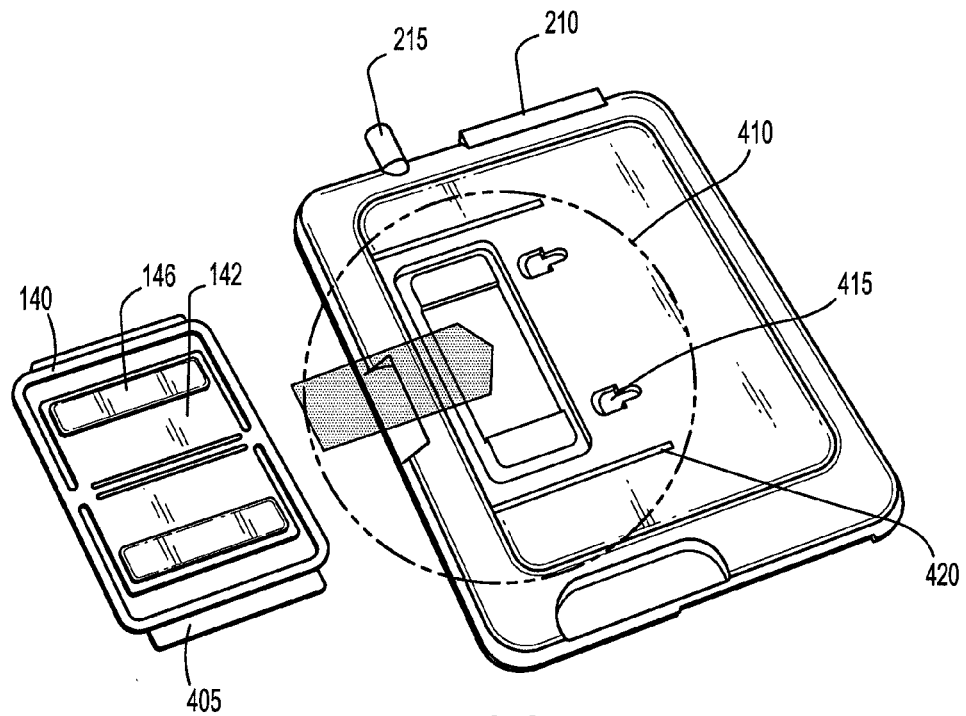
FIG. 4 illustrates a step of connecting a mounting bracket to a back of a multi-media memo board according to an exemplary embodiment of the present invention.
Figure 4:
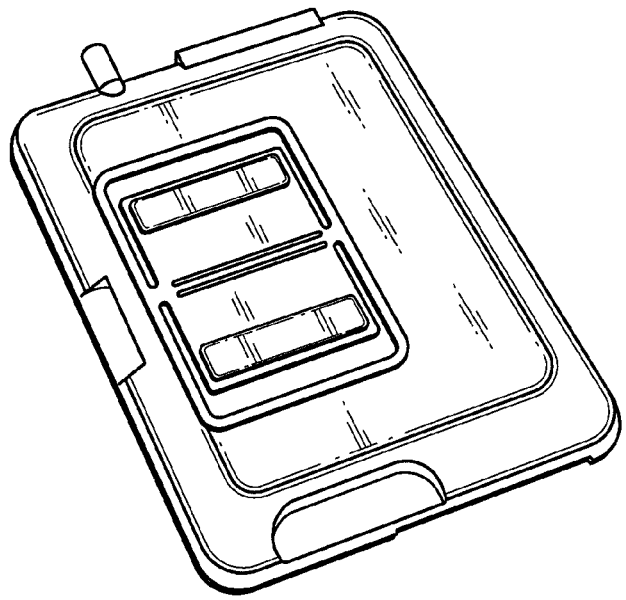

FIG. 4 illustrates a step of connecting a mounting bracket to a back of a multi-media memo board according to an exemplary embodiment of the present invention.

As shown in image (a) of FIG. 4, the mounting bracket 140 is slidably connected along a direction indicated by the arrow to a mounting bracket connector 410. The mounting bracket 140 is connected by sliding a pair of connecting guides 405 into corresponding receiving guides 420 of the mounting bracket connector 410. Then, the mounting bracket 140 is secured to the mounting bracket connector 410 by inserting male locking portions of the mounting bracket 140 into female locking portions 415 of the mounting bracket connector 410. Image (b) of FIG. 4, shows the back side of the multi-media memo board when the mounting bracket 140 is connected to the mounting bracket connector 410 as just described. To remove the mounting bracket 140 from the mounting bracket connector 410, a small object like a screwdriver can be wedged between the mounting bracket 140 and the mounting bracket connector 410 or the back side of the multi-media memo board can include a quick-release locking tab.

Figure 5:
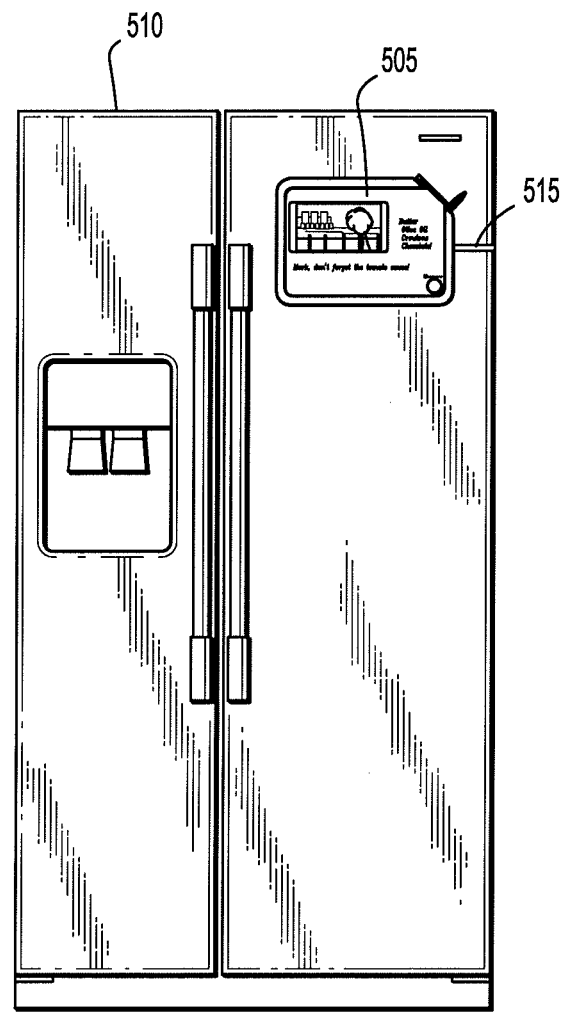
FIG. 5 illustrates a multi-media memo board mounted on a refrigerator according to an exemplary embodiment of the present invention.
Figure 6:
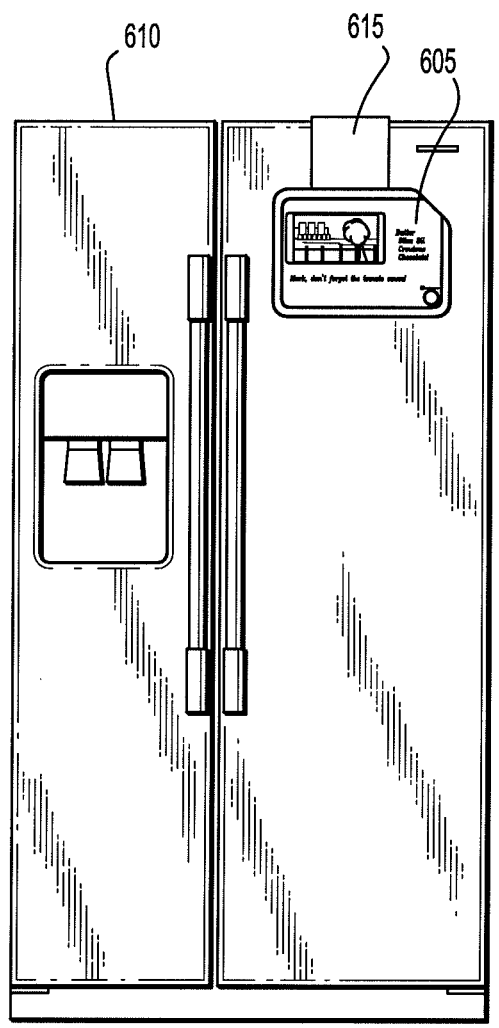
FIG. 6 illustrates a multi-media memo board mounted on a refrigerator according to an exemplary embodiment of the present invention.

FIGS. 5 and 6 illustrate a multi-media memo board 505/605 mounted on a refrigerator 510/610 according to an exemplary embodiment of the present invention.

Figure 7:
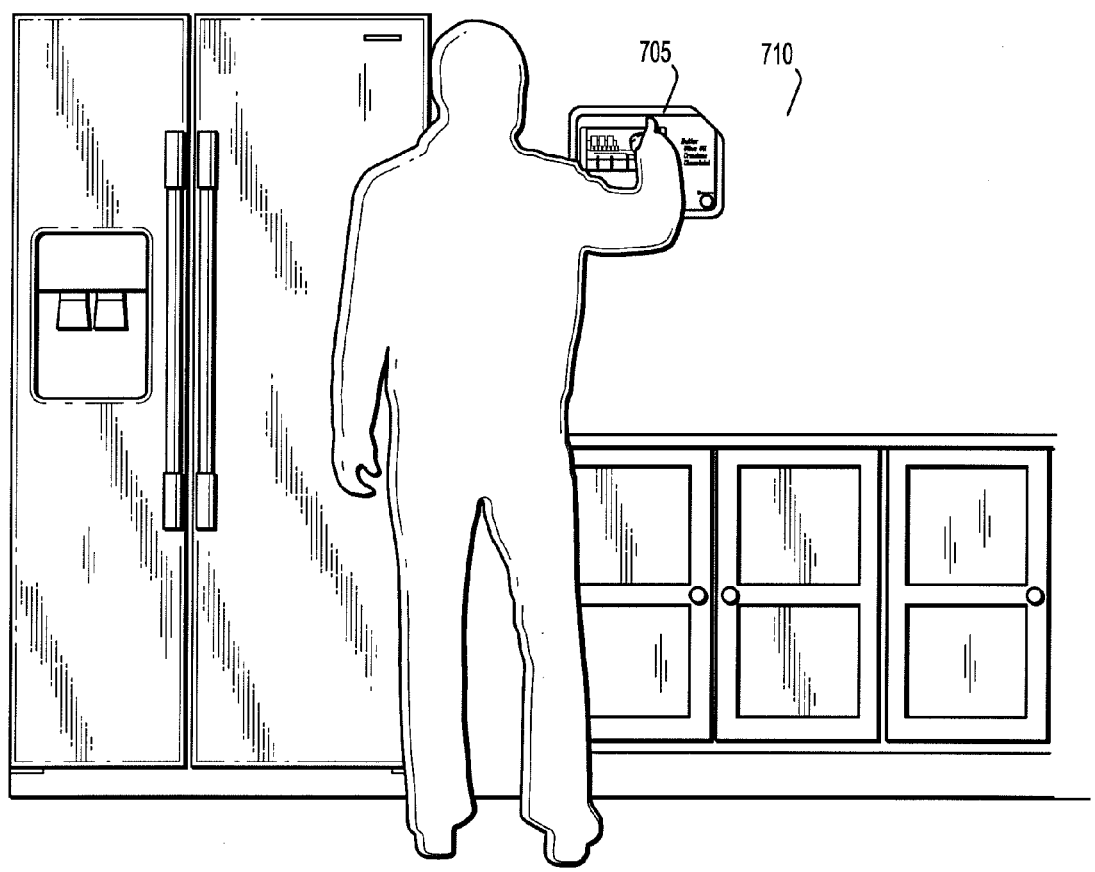
FIG. 7 illustrates a multi-media memo board mounted on a wall according to an exemplary embodiment of the present invention.
Figure 19:
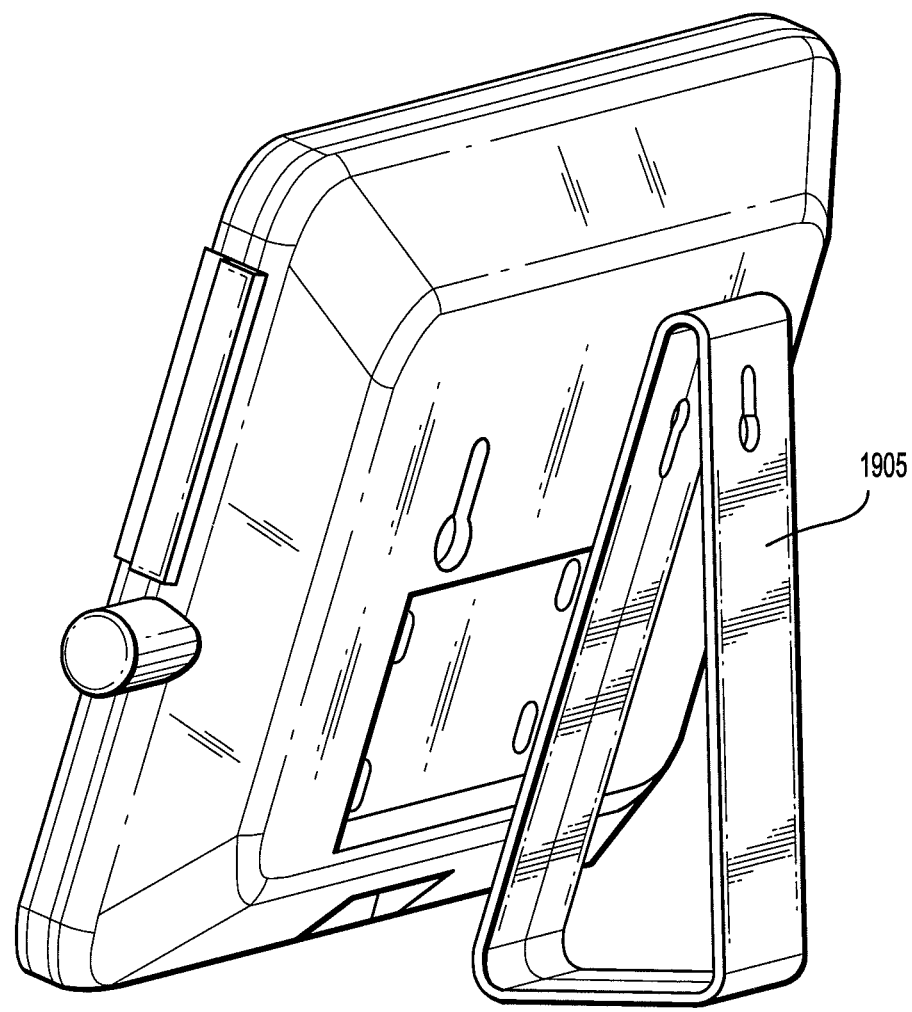
FIG. 19 illustrates a multi-media memo board mounted on a mounting stand according to an exemplary embodiment of the present invention.

In FIG. 5, the mounting bracket 140 is mounted to the refrigerator 510 by adhering the two-sided tape 146 on the flaps 142 to the refrigerator 510, and then, slidably connecting a mounting bracket connector of the multi-media memo board 505 to the mounting bracket 140. The multi-media memo board 505 may also be mounted to the refrigerator 510 when the mounting bracket 140 is already connected to the multi-media memo board 505 by pressing the multi-media memo board 505 up against the refrigerator 510 so that the two-sided tape 146 sufficiently adheres to the surface of the refrigerator 505. As shown in FIG. 7, a multi-media memo board 705 may also be mounted to a wall 710 in a similar fashion to that as described with reference to FIGS. 5 and 6. However, in this instance, screws can be inserted through the mounting holes 148 and into the wall 710 to connect the mounting bracket 140 to the wall 710. A multi-media memo board can also be placed on a flat surface such as a countertop. A multi-media memo board can also be stood on a flat surface by using, for example, a mounting stand 1905 as shown in FIG. 19.

Referring again to FIG. 5, a power chord 515 that is fit into the power chord area 168 is routed to the back of the refrigerator 510 for connection to a power outlet. Referring again to FIG. 6, the multi-media memo board 605 may be mounted to the refrigerator 610 by a mounting bracket 615 that hooks onto the top of the refrigerator 610 and onto a suitable portion of a mounting bracket connector.

Figure 8:
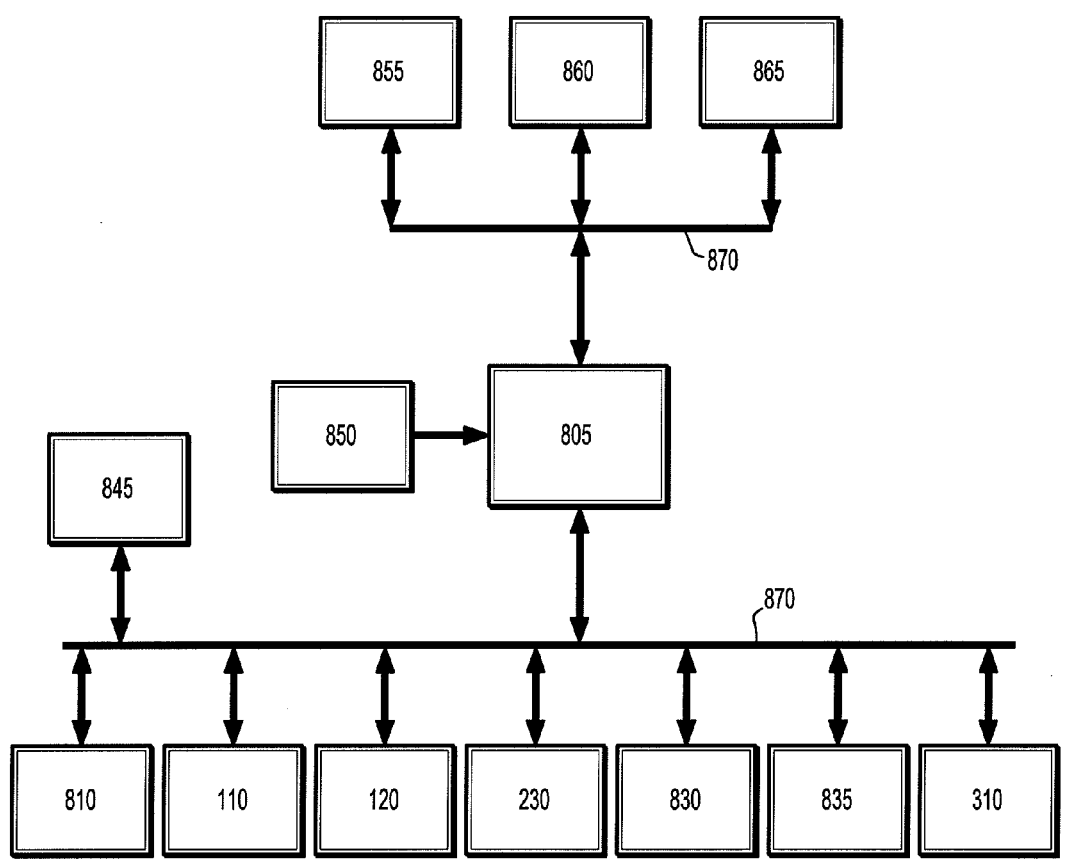
FIG. 8 is a block diagram illustrating components of a multi-media memo board according to an exemplary embodiment of the present invention.

FIG. 8 is a block diagram illustrating electronic components of a multi-media memo board according to an exemplary embodiment of the present invention.

As shown in FIG. 8, the multi-media memo board includes a controller 805 located on the printed circuit board 115, which may be, for example, a microcomputer that controls the operations of the components of the multi-media memo board. The controller 805 is connected to a number of components via a data transmission line 870 such as a data bus. More specifically, the controller 805 is connected to a memory 810 also located on the printed circuit board 115 that may be, for example, a 256 MB flash memory, the display module 110, keypad 120, camera 230, a microphone 830, speaker 835, and the light source 310. The controller 805 is also connected to a motion sensor 845 that can be used to turn the multi-media memo board on/off or take the multi-media memo board out of a stand-by mode, and a power source 850 that can be, for example, a rechargeable battery in addition to a power chord that couples to a wall outlet.

The controller 805 is further connected to a wireless interface 855 that may be, for example, a radio frequency or infrared transceiver, a wired interface 860 that may be, for example, a universal serial bus or RS-232 printer port, and a memory card interface 865 that is capable of receiving memory cards in SD/MMC/MS and CF/XD formats. The wireless interface 855 may be used, for example, to download pictures from a Bluetooth equipped cellular phone or to connect to a Wi-Fi home network. The wired interface 860 may be connected to a home security camera so that video from the security camera can be displayed on the front panel 205 of the display module 110.

Figure 9:
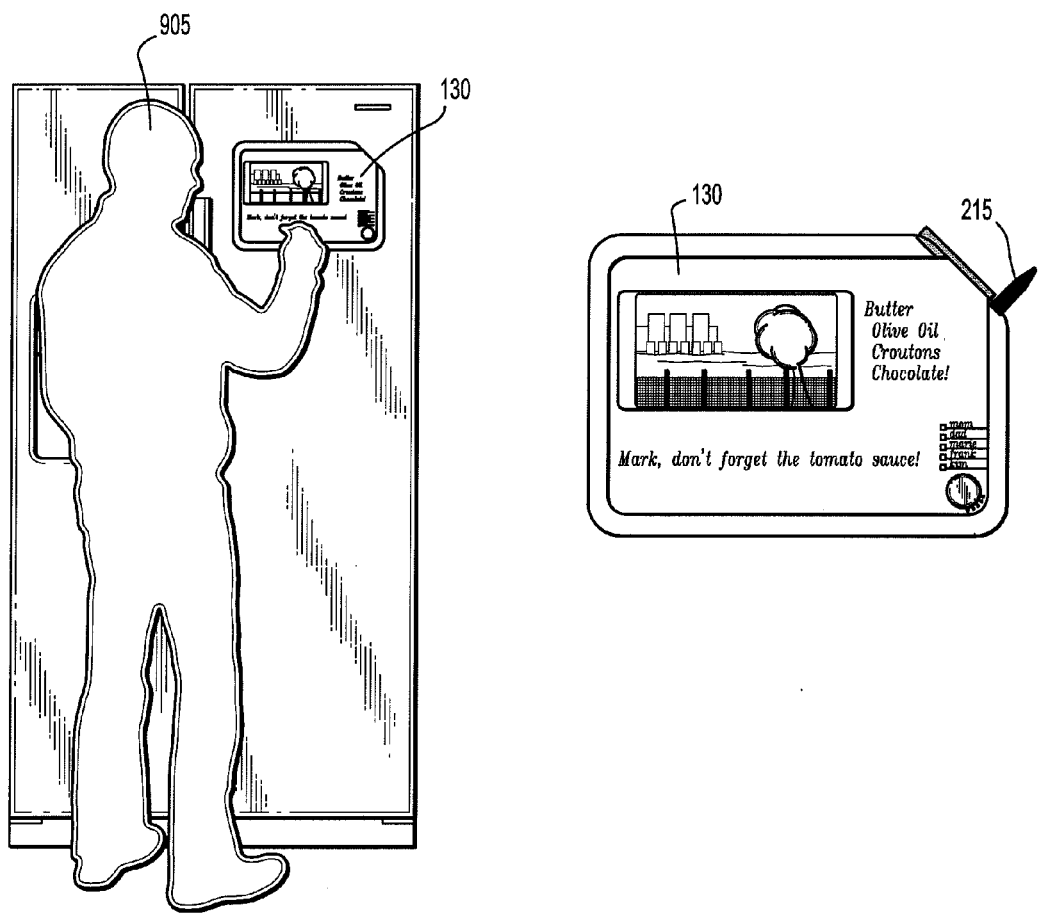
FIG. 9 illustrates a white board feature of a multi-media memo board according to an exemplary embodiment of the present invention.

FIG. 9 illustrates a white board feature of a multi-media memo board according to an exemplary embodiment of the present invention. As shown in FIG. 9, a person 905 can use the dry erase marker 215 to write anywhere on a front surface of the screen 130.

Figure 10A:
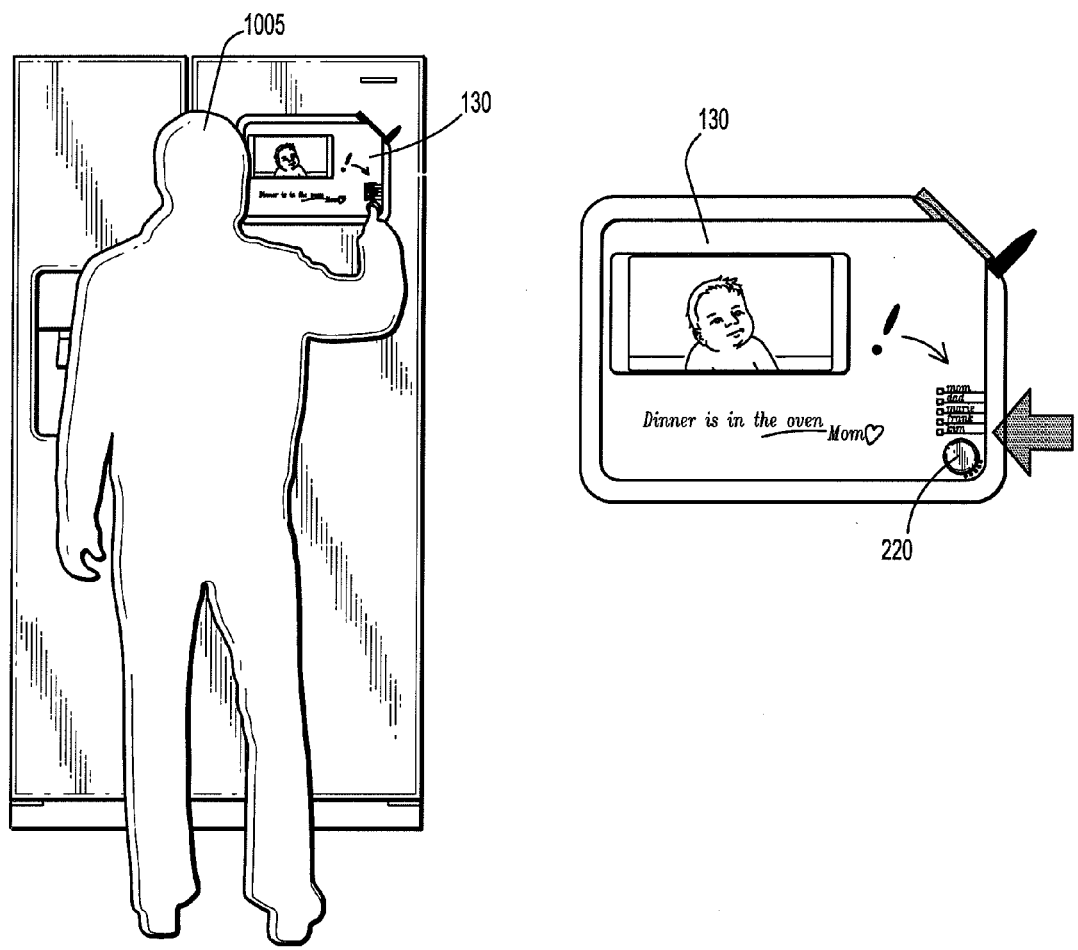
FIGS. 10A and 10B illustrate an audio message feature of a multi-media memo board according to an exemplary embodiment of the present invention.
Figure 10B:
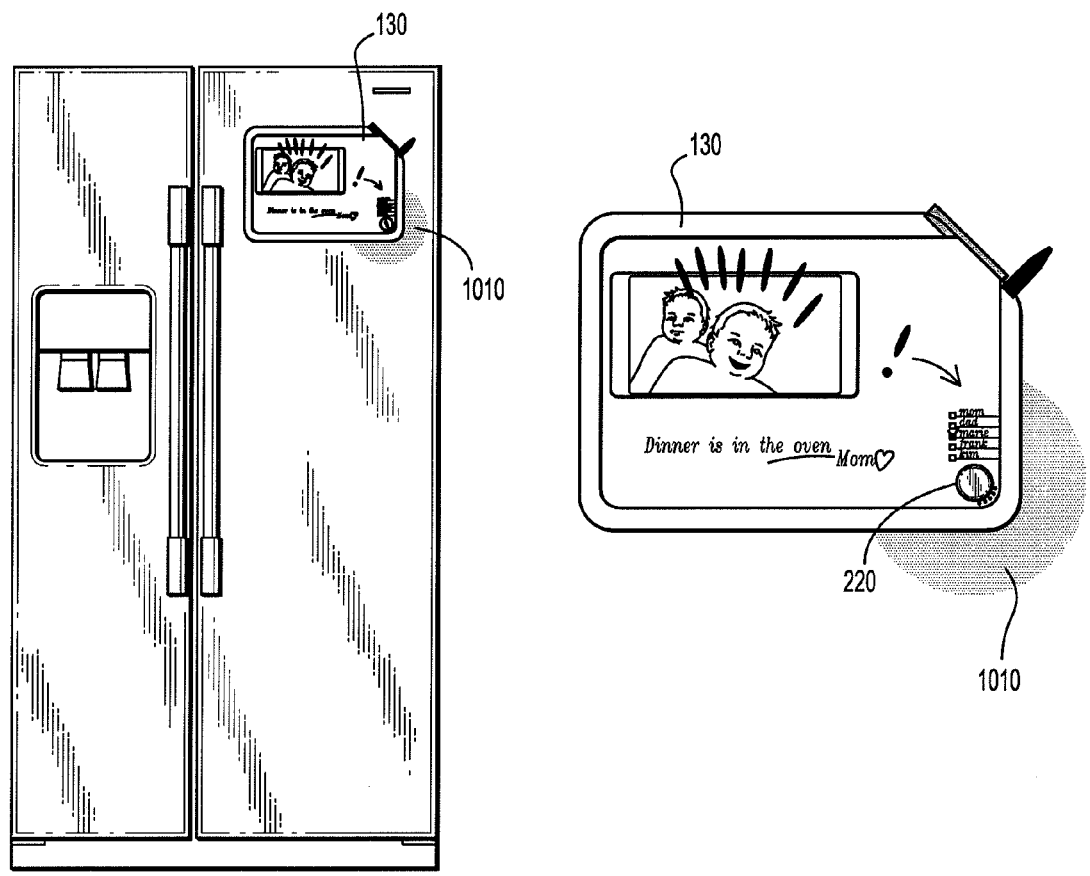

FIGS. 10A and 10B illustrate an audio message feature of a multi-media memo board according to an exemplary embodiment of the present invention.

As shown in FIG. 10A, if a person 1005 wants to leave an audio message for a someone, the person 1005 can press and hold the button 220 and after a short beep, the person 1005 can speak their message. The person 1005 can indicate whom the intended recipient of the message is by writing their name on lines (as indicated by the arrow) above the button 220. As shown in FIG. 10B, a light 1010 can be shined on a front surface of a refrigerator to indicate that a new message is waiting for the intended recipient. The message can be played by pressing the button 220 once. The message can be erased by pressing the button 220 twice.

Figure 11:
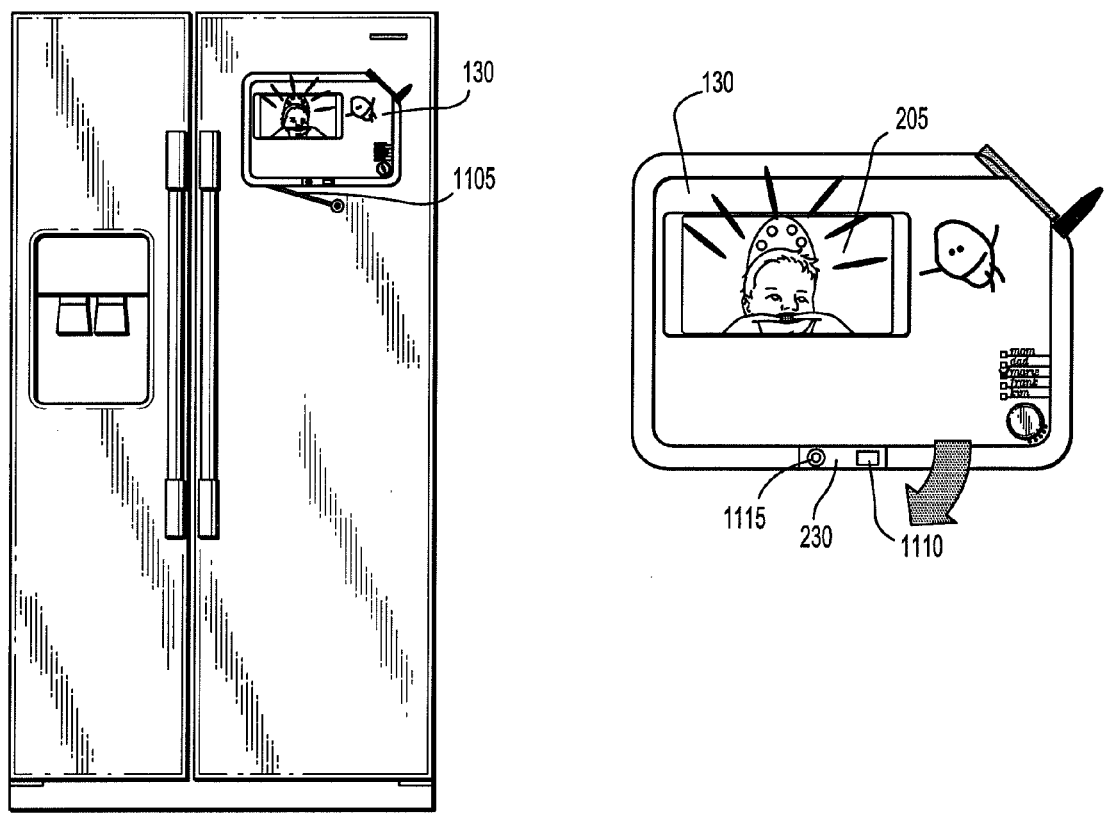
FIG. 11 illustrates a camera feature of a multi-media memo board according to an exemplary embodiment of the present invention.

FIG. 11 illustrates a camera feature of a multi-media memo board according to an exemplary embodiment of the present invention.

As shown in FIG. 11, a picture may be taken by adjusting an angle of the camera 230 by moving the camera 230 in a direction indicated by the arrow. An adjustable arm 1105 facilitates the movement and positioning of the camera 230. Once the camera 230 is in position, a button 1110 on a side of a camera eye 1115 is pressed. A picture is automatically shown on the front panel 205 of the display module 110 and a prompt on the front panel 205 asks if you want to keep the image or not. The button 1110 is pressed once to keep the picture and twice to delete the picture. If kept, the photo may be placed, for example, in an active slide show. When the camera 230 is a digital video camera, a person may leave a video message in a manner similar to that described above with reference to FIGS. 10A and 10B.

Figure 12:
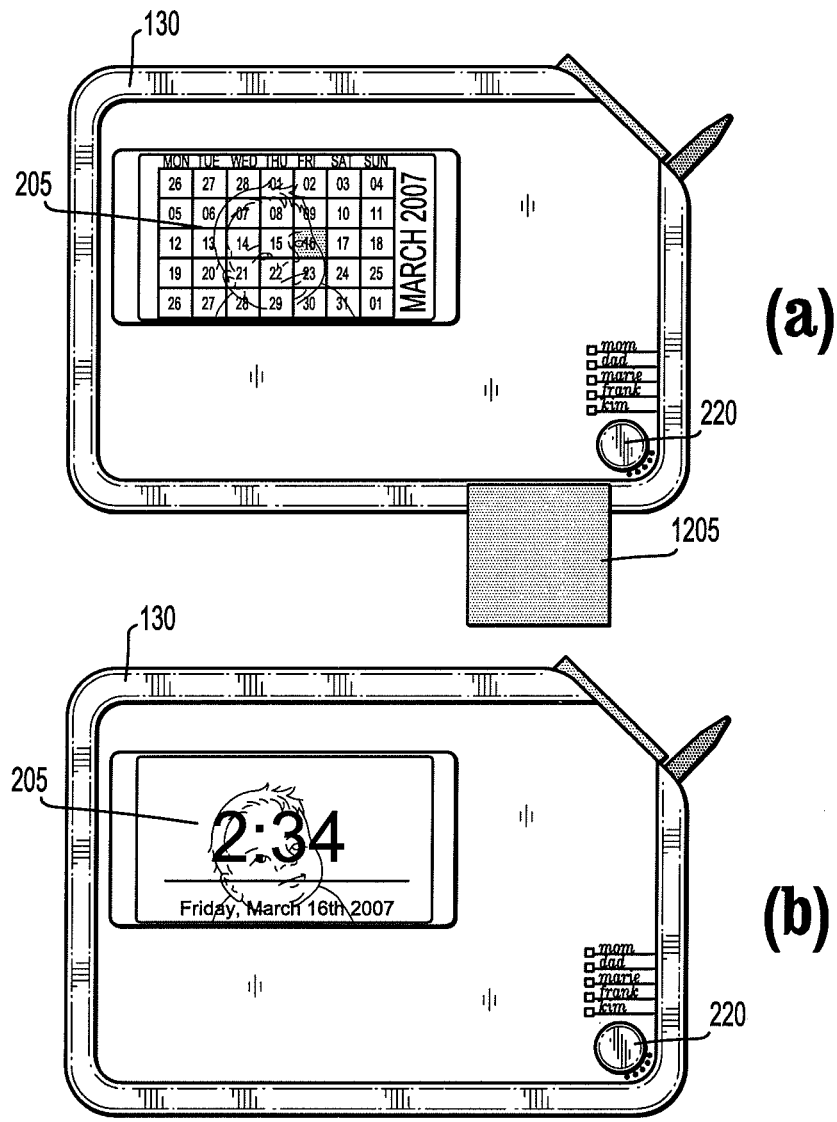
FIG. 12 illustrates a clock feature and a calendar feature of a multi-media memo board according to an exemplary embodiment of the present invention.

FIG. 12 illustrates a clock feature and a calendar feature of a multi-media memo board according to an exemplary embodiment of the present invention.

In image (a) of FIG. 12, a calendar feature may be brought up by using, for example, a control key on the keypad 120. The present date will be highlighted on the front panel 205 of the display module 110. Next and previous keys on the keypad 120 will allow a user to navigate from one day to another. The audio and video message features can be linked to a specific date on the calendar. For example, when the date to which a message is linked arises, the front panel 205 will provide a visual indication that the message is ready to be played. The message can be retrieved by highlighting the date and pressing the button 220 once. A double press on the button 220 will erase the message. In addition, the calendar can be used to highlight birthdays of family members and to provide a visual reminder regarding an upcoming birthday. Image (a) also illustrates a post-it note 1205 adhered to the front of the multi-media memo board.

In image (b) of FIG. 12, a clock feature may be brought up by pressing, for example, a clock key on the keypad 120. The clock will display the time and date in full. The clock will have four settings: 1) large-size and in the center of the front panel 205 of the display module 110 over the last image of a slide show, 2) medium-size and in the center or bottom edge of the front panel 205 over the last image of the slide show, 3) small-size and at the bottom right of the front panel 205 over all photos, and 4) off.

Other features not described above can also be used in accordance with the present invention. For example, the present invention may include a calorie counter feature that enables users to keep track of the number of calories in the food they eat. In addition, the present invention may include a grocery list feature that enables users to store a grocery list that can be printed via, for example, a printer port. The grocery list feature can include pre-sets that the user picks, e.g., milk bread, etc. It is to be understood that a user may select a feature of the present invention by pressing, for example, a menu key on the keypad and scrolling through a list of operable functions by using up and down arrow keys until they reach the desired feature, and then, pressing a select key to execute the desired feature.

Figure 13:
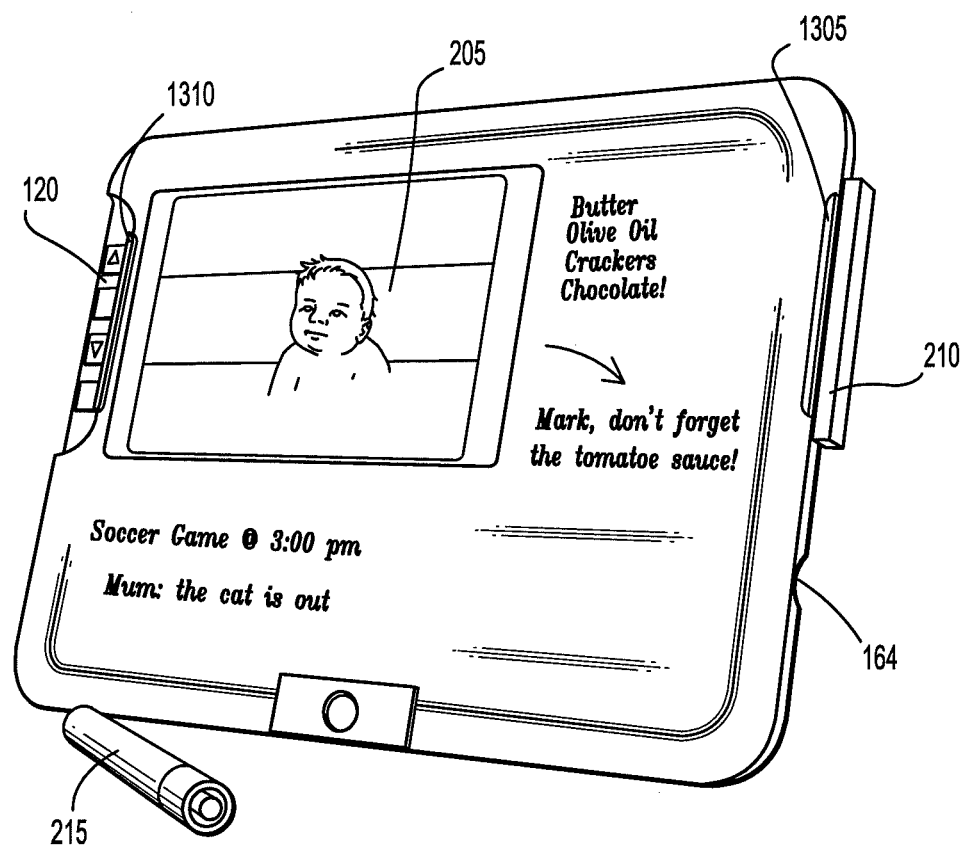
FIG. 13 is a perspective front view of a multi-media memo board according to an exemplary embodiment of the present invention.

FIG. 13 is a perspective front view of a multi-media memo board according to an exemplary embodiment of the present invention.

Figure 17:
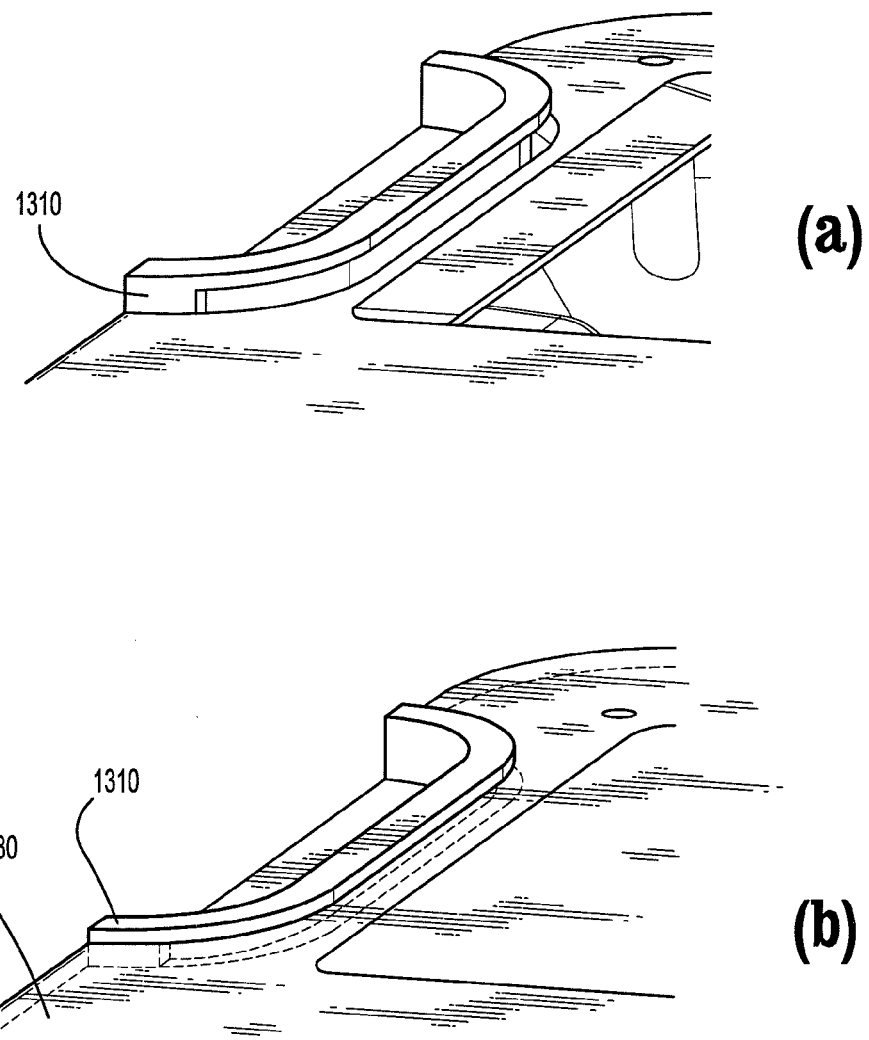
FIG. 17 illustrates a fastener of a multi-media memo board according to an exemplary embodiment of the present invention.
Figure 18:
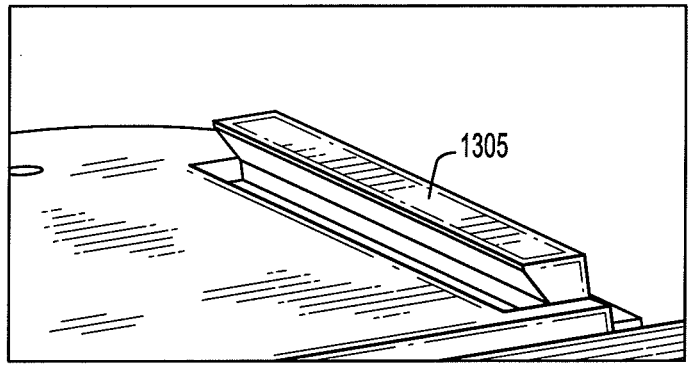
FIG. 18 illustrates a fastener of a multi-media memo board according to an exemplary embodiment of the present invention.
Figure 18:
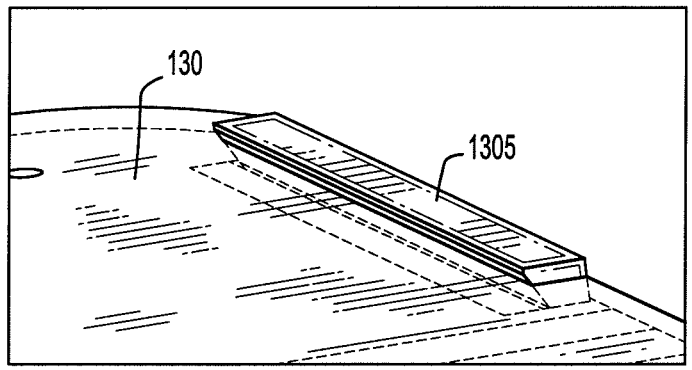

As shown in FIG. 13, the multi-media memo board is similar to the multi-media memo boards discussed above; however, the location of the keypad 120 is different. For example, in this embodiment the keypad 120 is located on the left hand side of the screen 130 and its keys are exposed through an opening thereof. In addition, the locations of the marker area 164 and the notepad area 166 are on the right hand side of the screen 130. The multi-media memo board shown in FIG. 13 also includes a snap 1305 and a hook 1310 that are used to secure the screen 130 to the front housing 105. The snap and hook 1305 and 1310 enable the screen 130 to be removed and replaced, for example, in the event a permanent marker is used to write on the screen 130. The hook 1310 is shown in image (a) of FIG. 17 without the screen 130 connected thereto and in image (b) of FIG. 17 with the screen 130 connected thereto. The snap 1305 is shown in image (a) of FIG. 18 without the screen 130 connected thereto and in image (b) of FIG. 18 with the screen 130 connected thereto.

Figure 14:
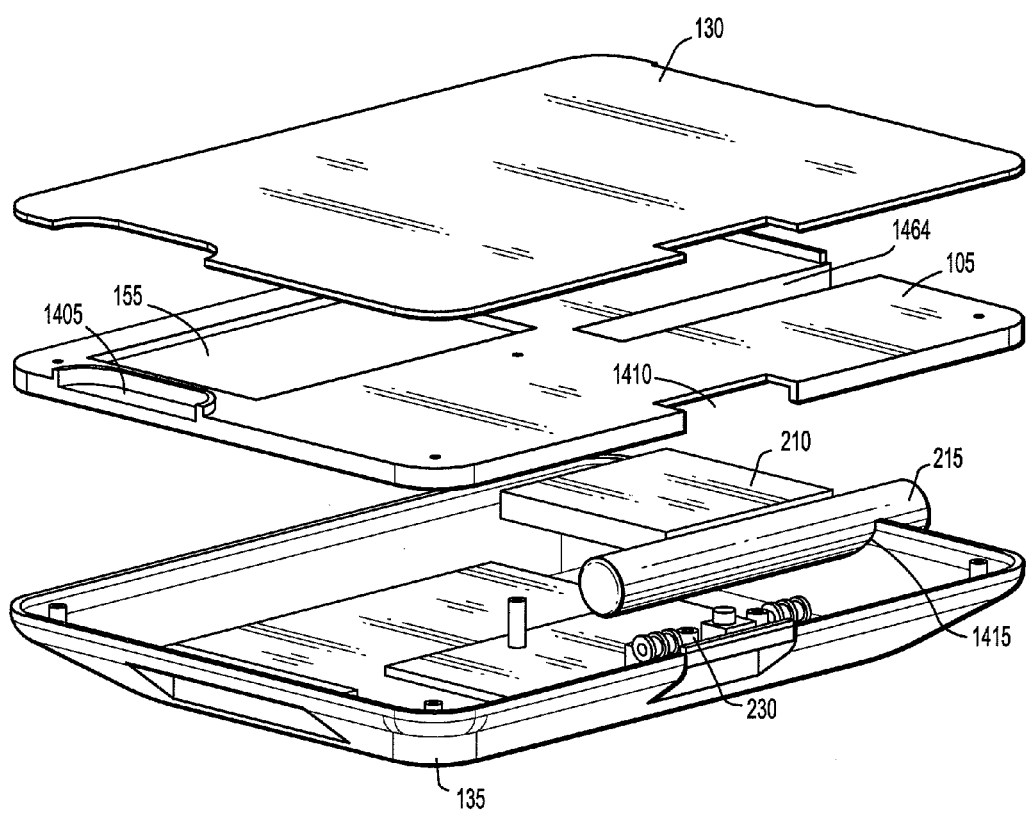
FIG. 14 is an exploded perspective view of a multi-media memo board according to an exemplary embodiment of the present invention.
Figure 15:
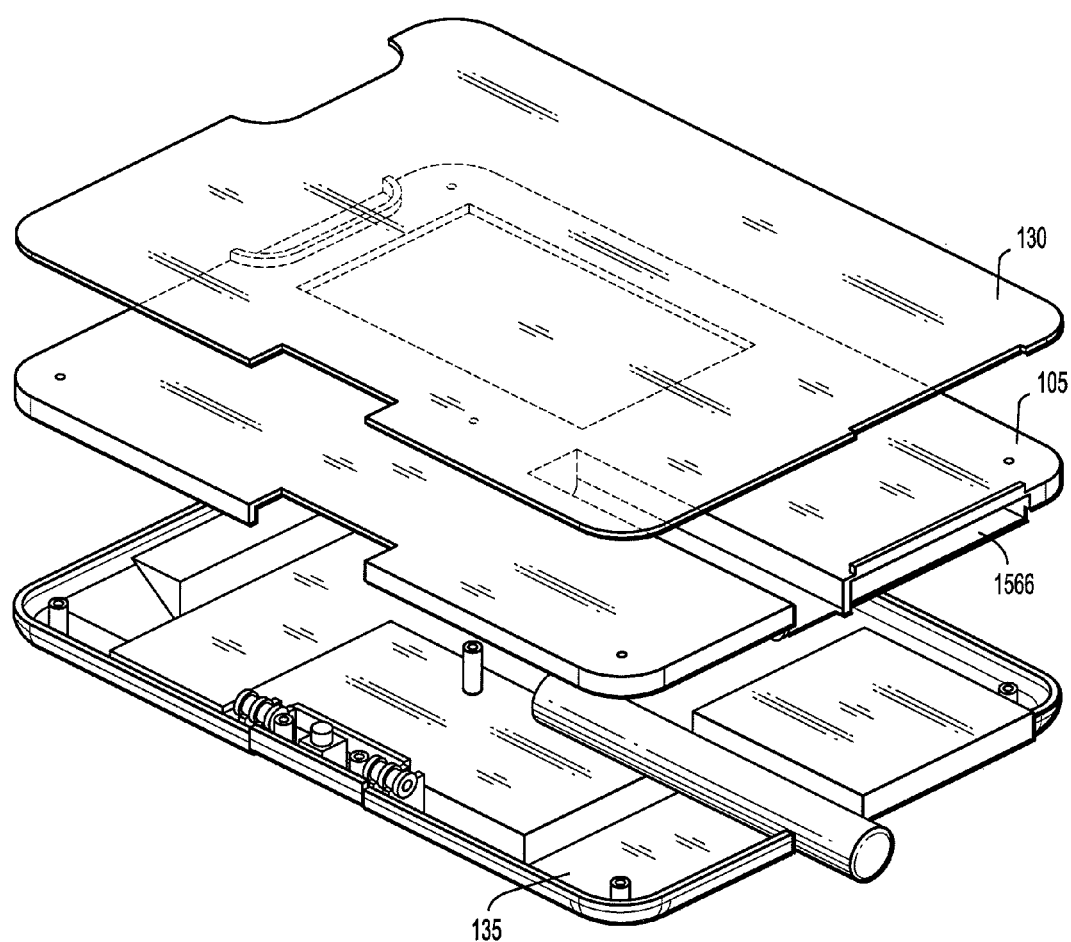
FIG. 15 is an exploded perspective view of a multi-media memo board according to an exemplary embodiment of the present invention.

FIGS. 14 and 15 are exploded perspective views of a multi-media memo board according to an exemplary embodiment of the present invention.

As shown in FIGS. 14 and 15, the multi-media memo board is similar to the multi-media memo board discussed above with reference to FIG. 13; however, an opening 1405 in the front housing 105 for the keypad 120 is shown and an opening 1410 in the front housing 105 for the camera 230 is shown. In addition, cavities 1464 and 1566 for the marker 215 and notepad 210 are provided in the front housing 105. Further, FIGS. 14 and 15 show the camera 230 situated in the back housing 135 and a concave edge 1415 of the back housing 135.

Figure 16:
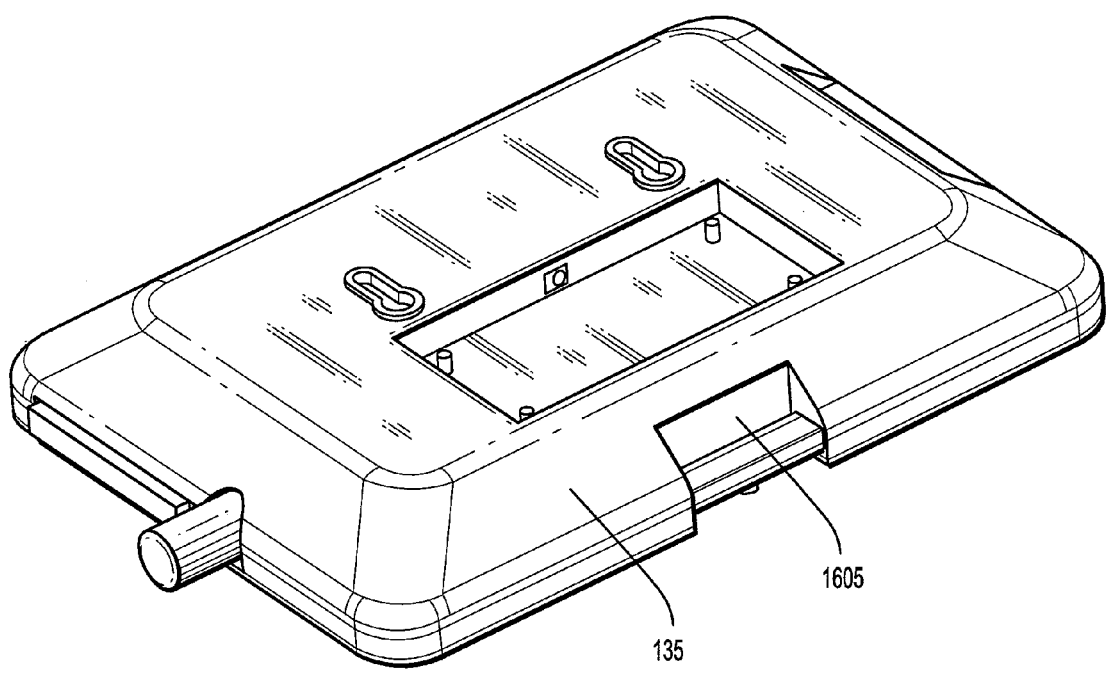
FIG. 16 is a perspective back view of a multi-media memo board according to an exemplary embodiment of the present invention.

FIG. 16 is a perspective back view of a multi-media memo board according to an exemplary embodiment of the present invention that illustrates a cavity 1605 in the back housing 135 for storing the adjustable arm 1105 of the camera 230.

In accordance with an exemplary embodiment of the present invention, a multi-media memo board is provided. The multi-media memo board is mountable in a variety of places in the home such as a refrigerator or foyer wall and includes a digital picture frame for displaying pictures, a camera for taking pictures or filming video, an audio and video memo function for leaving audio and video messages and a removable acrylic screen for leaving written messages and pasting notes, shopping lists, etc. The multi-media memo board is operated by entering input commands on a keypad located on a face thereof. The multi-media memo board also includes storage areas for a notepad and a marker.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A memo board, comprising:
    a front housing including a first opening;
    a display module disposed behind a front side of the front housing, a front panel of the display module being exposed through the first opening of the front housing;
    a circuit board disposed behind the front side of the front housing, the circuit board including a memory and a controller;
    a back housing configured to receive the circuit board, the display module and the front housing through an opening at a front side of the back housing, the back housing including a mounting connector at a back side of the back housing; and
    a screen disposed at the front side of the front housing, the front panel of the display module being viewable through the screen, the screen being secured to and removed from the front housing by first and second fasteners,
    wherein the mounting connector is configured to couple with a mounting bracket such that arms of the mounting bracket lay flat on the back side of the back housing when arms of the mounting bracket are in a closed position and such that the mounting bracket protrudes from the back side of the back housing when the arms of the mounting bracket are in an open position,
    wherein the mounting connector includes first and second elongated grooves to receive opposite sides of the mounting bracket;
    wherein the arms of the mounting bracket are adjustable to conform to a surface to which the mounting bracket is to be connected,
    wherein each adjustable arm includes tape for connecting the mounting bracket to the surface;
    wherein the mounting bracket includes at least two mounting holes through which mounting screws are inserted to connect the mounting bracket to the surface.

2. The memo board of claim 1, further comprising:
    a keypad disposed behind the front side of the front housing, the keypad including a plurality of keys, an external surface of each of the keys being exposed through a second opening of the front housing.

3. The memo board of claim 1, further comprising:
    a metal plate disposed in between the front housing and the screen along an edge of the front side of the front housing.

4. The memo board of claim 1, wherein the screen is made of acrylic.

5. The memo board of claim 1, wherein the screen is made of polycarbonate covered with an acrylic film.

6. The memo board of claim 1, wherein the front housing is substantially rectangular, the display module is located in an upper left-hand corner of the front housing, a camera is disposed in a central-part of a lower edge of the front housing, a notepad and writing means are disposed behind an upper right-hand corner of the front housing, and a microphone opening for receiving a voice message and a voice message recording switch are disposed in a lower right-hand corner of the front housing, and
    wherein the back side of the back housing includes a substantially flat surface around its perimeter and, at a distance from an edge of the back side a portion of the back side perpendicular to the substantially flat surface protrudes away from the substantially flat surface to form a case that accommodates the circuit board, the display module and the front housing and, in a side edge of the case, receptacles are formed to hold the notepad and writing means.

7. The memo board of claim 6, wherein the camera is configured to take pictures to be displayed on the front panel of the display module.

8. The memo board of claim 7, further comprising:
    an adjustable arm connected to the camera, the adjustable arm configured to move the camera.

9. The memo board of claim 6, further comprising:
    a speaker configured to play the voice message.

10. The memo board of claim 9, further comprising:
    a light source disposed in the lower right-hand corner of the front housing and configured to emit light to indicate to a user that the voice message is waiting to be played.

11. The memo board of claim 6, further comprising a groove formed along a back side of the protruded case to accommodate a power cord.

12. The memo board of claim 6, further comprising:
    a keypad disposed behind the front side of the front housing in a receptacle formed in another side edge of the protruded case.

13. A memo board, comprising:
    a front housing including first and second openings, first and second cavities, a first recess and first and second fasteners;
    a display module disposed behind a front side of the front housing, a front panel of the display module being exposed through the first opening of the front housing;
    a circuit board disposed behind the front side of the front housing, the circuit board including a memory and a controller;
    a back housing configured to receive the circuit board, the display module and the front housing through an opening at a front side of the back housing, the back housing including a mounting connector at a back side of the back housing, a camera having a lens, the lens of the camera being exposed through the second opening of the front housing, and a concave edge through which the second cavity is accessed;
    a keypad disposed in the first recess of the front housing; and
    a screen disposed over the front side of the front housing and not over the keypad and the camera lens, the screen connected to the front housing by the first and second fasteners,
    wherein the mounting connector is configured to couple with a mounting bracket such that arms of the mounting bracket lay flat on the back side of the back housing when arms of the mounting bracket are in a closed position and such that the mounting bracket protrudes from the back side of the back housing when the arms of the mounting bracket are in an open position, wherein the mounting connector includes first and second elongated grooves to receive opposite sides of the mounting bracket;

wherein the arms of the mounting bracket are adjustable to conform to a surface to which the mounting bracket is to be connected, wherein each adjustable arm includes tape for connecting the mounting bracket to the surface;

wherein the mounting bracket includes at least two mounting holes through which mounting screws are inserted to connect the mounting bracket to the surface.

14. The memo board of claim 13, wherein a notepad is disposed in the first cavity and a writing means is disposed in the second cavity.

\* \* \* \* \*